Aug. 16, 1955     P. S. BUECHEL     2,715,406
CLEANING DEVICE FOR HYPODERMIC SYRINGE PARTS
Filed May 23, 1951     3 Sheets-Sheet 1
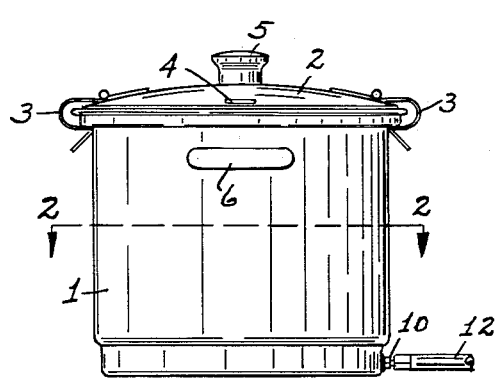
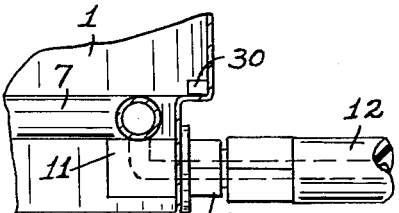
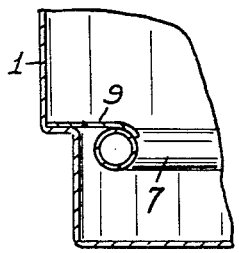
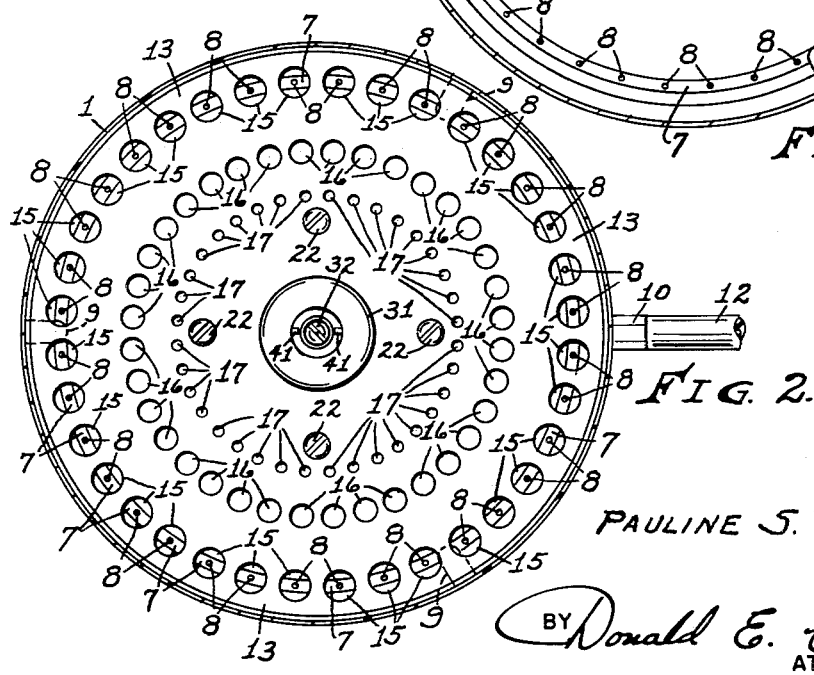
PAULINE S. BUECHEL, INVENTOR.
BY Donald E. Windle
ATTORNEY.

Aug. 16, 1955 P. S. BUECHEL 2,715,406
CLEANING DEVICE FOR HYPODERMIC SYRINGE PARTS
Filed May 23, 1951 3 Sheets-Sheet 2
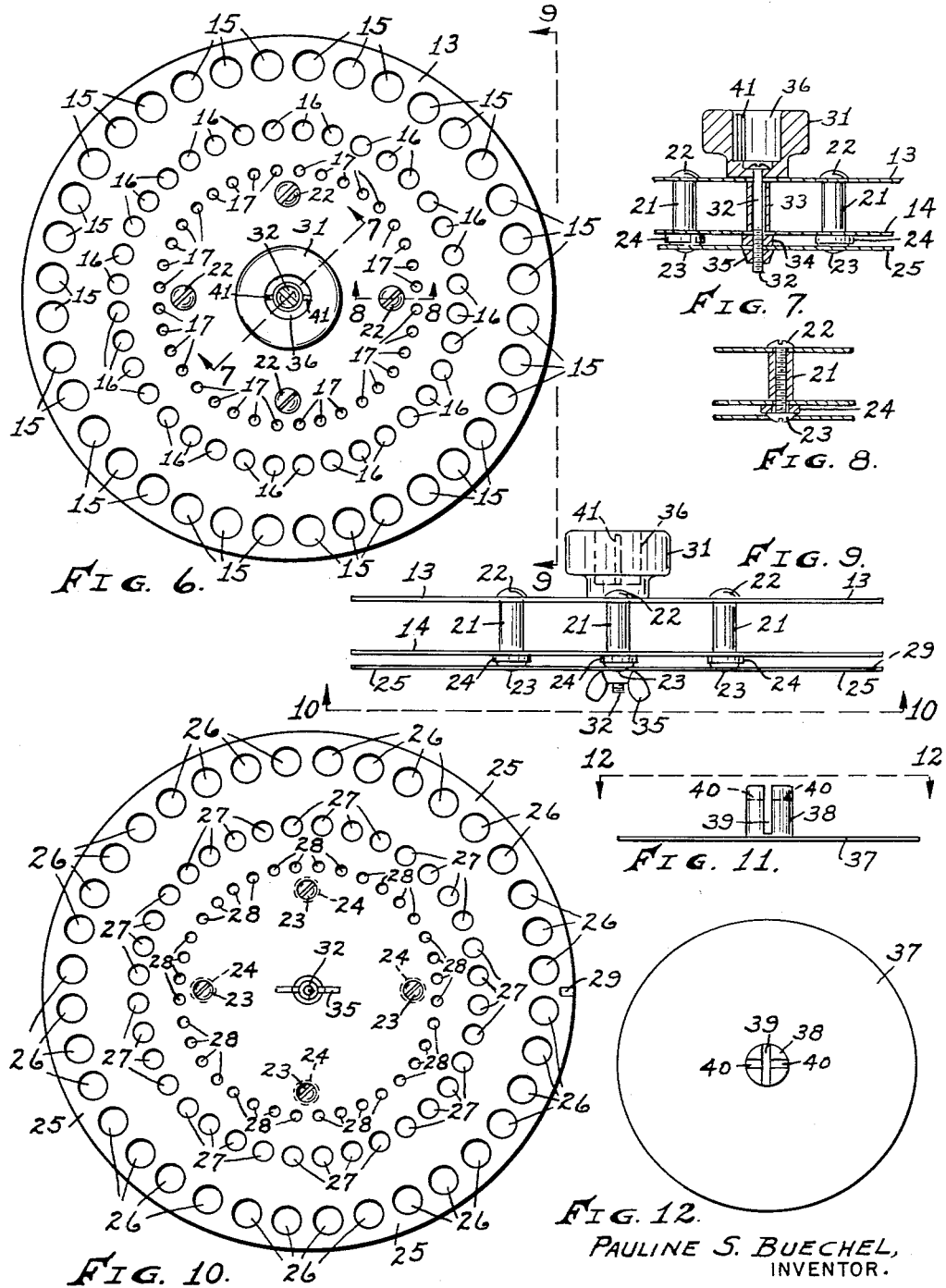
PAULINE S. BUECHEL, INVENTOR.
BY Donald E. Windle
ATTORNEY.

Aug. 16, 1955 P. S. BUECHEL 2,715,406
CLEANING DEVICE FOR HYPODERMIC SYRINGE PARTS
Filed May 23, 1951 3 Sheets-Sheet 3
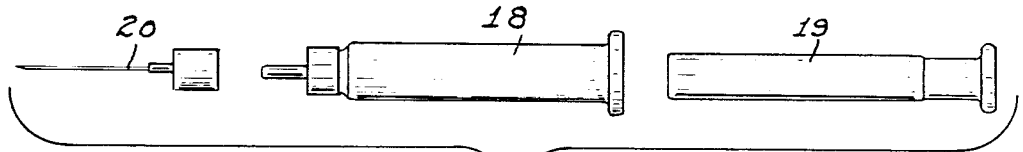
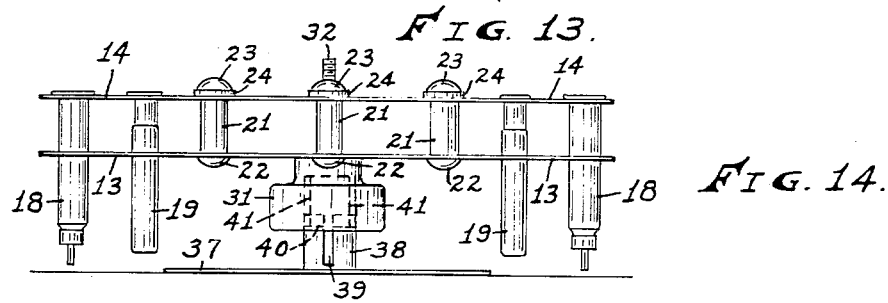
FIG. 13.
FIG. 14.
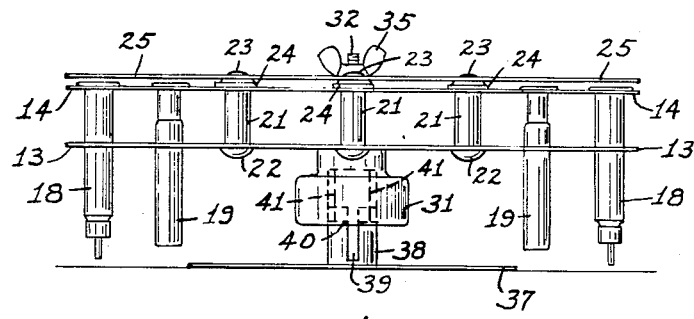
FIG. 15.
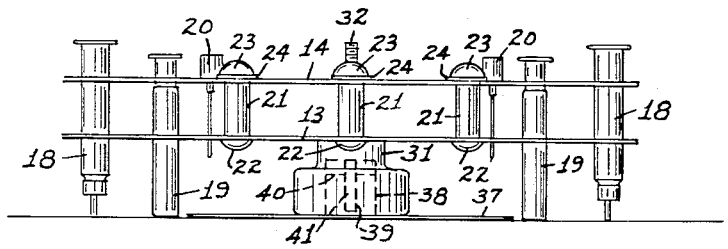
FIG. 16.
PAULINE S. BUECHEL,
INVENTOR.
BY Donald E. Windle
ATTORNEY.

United States Patent Office 2,715,406
Patented Aug. 16, 1955

2,715,406

CLEANING DEVICE FOR HYPODERMIC SYRINGE PARTS

Pauline S. Buechel, Richmond, Ind.

Application May 23, 1951, Serial No. 227,918

2 Claims. (Cl. 134—94)

Broadly speaking, the invention relates to cleaning devices, and more particularly to devices for use in cleaning the parts of hypodermic syringes.

The principal object of the invention is the provision of means for separably holding the members of hypodermic syringes for the purpose of cleaning and sterilizing the same, and in providing an arrangement thereby for maintaining the members in matched relation throughout the cleaning and sterilizing operation thereof.

A second object is the provision of a cleaning device for hypodermic syringe parts in which the detergent used therefor is agitated to aid in the thorough cleaning of the parts.

Another object is the provision of a device which is simple of construction and operation, and which is economical to manufacture.

Other objects and particular advantages of the invention will become more apparent in the course of the following description, and that which is new will be pointed out in the appended claims.

The most satisfactory manner of carrying out the principles of the invention is shown in the accompanying drawings, in which:

Figure 1 is a side elevation of a cleaning and washing device embodying the features of the invention.

Figure 2 is a sectional detail, taken on line 2—2 of Figure 1, and showing the container member with the syringe parts holder thereof being shown therein but without the syringe parts being shown.

Figure 3 is a detail section similar to that shown in Figure 2, but with the syringe parts holder being omitted therefrom.

Figure 4 is a detail section through the side of the device, as taken on line 4—4 of Figure 3.

Figure 5 is a detail section through the side of the device, as taken on line 5—5 of Figure 3, and showing the connection between the agitator ring and the air tube leading thereto.

Figure 6 is a top plan view of the parts comprising the syringe parts holder.

Figure 7 is a detail section through the central portion of the parts holder members, as taken on line 7—7 of Figure 6.

Figure 8 is a detail section through one of the plate-spacing members.

Figure 9 is a detail side elevation of the assembly of the parts-holding members.

Figure 10 is a bottom elevation of the parts-holding members, as taken from line 10—10 of Figure 9.

Figure 11 is a side elevational detail of a stand member used for support of the parts-holder while the same is being either loaded or unloaded.

Figure 12 is a detail plan view of the stand member, taken from line 12—12 of Figure 11.

Figure 13 is a side elevational view of the parts of a syringe.

Figure 14 is a side elevation of the device showing the position and arrangement thereof while in the process of being loaded.

Figure 15 is a detail side elevation similar to that shown in Figure 14 but with the retaining plate or cover thereof being shown in position, and Figure 16 shows the device in unloading position.

Like characters of reference designate like parts throughout the several views of the drawings.

In order that the novel and useful features and the advantages of the invention may be more fully understood and appreciated, I will now take up a detailed description thereof, in which the same will be more fully and comprehensively set forth.

Referring now to the drawings in detail, 1 designates the container member of the device which has a cover member 2 adapted to be held thereon by means of a pair of spring clamps 3, as indicated in Figure 1. The cover is provided with a relief valve member 4 of the conventional type for relieving excess pressure from within the container. A knob or handle member 6 provides means for carrying or moving the device.

Located within the container near the bottom thereof and concentric therewith is an air circulating tube or ring 7 having a plurality of upwardly-directed apertures 8 formed therein, with the tube being secured in spaced relation with the side of the container by means of lugs 9, as shown in Figures 2, 3 and 4. A connection 10 is provided through the wall of the container for admitting air under pressure into the circulating tube 7, and is connected with the tube as at 11 in Figure 5. A flexible tube 12 is provided between the device and an air storage tank (not shown).

The syringe parts holding members comprise circular plates 13 and 14, with both plates being the same and with each having three concentric circles of holes formed therethrough with the outer holes 15 being of sufficient diameter to accept the barrel members 18 of syringes, the intermediate holes 16 are of sufficient diameter to accept the plunger members 19, and with the holes 17 forming the inner circle being of such diameter to accept the needle members 20 of the syringes. Plates 13 and 14 are secured in spaced relation by means of spacer sleeves 21 with screws 22 being threaded into one end thereof and screws 23 being threaded into the opposite end thereof. It will be noted, by referring to Figures 7, 8, 9, 14 and 15, that each of the screws 23 has a washer or spacer 24 under the head thereof, the purpose of which will be hereinafter set forth.

A third circular plate 25 is provided for locking or retaining the barrels and plungers in place in plates 13 and 14 and is removably secured in connection with plates 13 and 14.

Plate 25, like plates 13 and 14, has three sets of apertures formed therethrough with the outer series of holes 26 being in alignment with holes 15 of plates 13 and 14, intermediate series of holes 27 being in alignment with holes 16, and inner series of holes 28 being in alignment with holes 17. Holes 26, 27 and 28 may be of the same, or substantially the same diameters as holes 15, 16 and 17 respectively. Plate 25 is similar in all respects to plates 13 and 14 except that a notch 29 is formed through the edge thereof and is adapted to register with lug 30 of the container member. The registration of notch 29 and lug 30 positions each of the barrel members of a syringe directly over one of the holes 8 in the circulating tube or ring 7.

A knob member 31 is secured through plates 13 and 14 by means of a threaded screw 32 extending therethrough and being provided with a spacer sleeve 33 positioned between plates 13 and 14, and with a nut 34 being threaded thereon against plate 14, as shown in Figure 7. A wing nut 35 provides means removably securing plate 25 in position with relation to plate 14. Apertures are formed through plate 25 to register with screws 23 which, together with washers 24, provides a means spacing plate 25 away from plate 14, as shown in Figures 8 and 9. A counterbore 36 is formed in the outer end of knob 31, the purpose of which will be hereinafter set forth. Ribs 41 are formed in counterbore 36 and extend inwardly a short distance.

A stand, composed of plate 37 and a stud 38 secured thereto, is provided for supporting the assembly of plates 13 and 14 in loading and unloading positions. Two slots, 39 and 40, are formed crosswise of stud 38 and are at right angles with each other. Slot 39 is cut deeper than slot 40 and thereby providing two separate levels therein for the reception of ribs 41 of knob 31. Counterbore 36 is adapted to extend downwardly over stud 38 with ribs 41 being in register with slot 40 while the device is being loaded, as shown in Figures 14 and 15. When the barrels and plungers are to be removed from the holder, ribs 41 are positioned in slot 39 which permits the upper ends of the barrels and plungers to be raised above the surface of plate 14, as shown in Figure 16.

In the use of the device, the same is positioned as shown in Figure 14 with ribs 41 being positioned in slots 40 of the stand member and is loaded with barrel members 18 and plunger members 19, with companion members 18 and 19 being placed in adjacent respective holes 15 and 16 in order to maintain the respective members 18 and 19 in matched relation. After the device has been loaded with the members, plate 25 is positioned on the loaded device and removably secured thereon by means of wing nut 35 being threaded on the projecting end of screw 32, as indicated in Figure 15. The flanges formed on the upper ends of the barrels and plungers are of greater diameter than the respective holes 26 and 27. The loaded device is then positioned in the container with notch 29 and lug 30 being in register. When the notch 29 and lug 30 are in register, each of the barrel members is in concentric relation with a respective aperture 8 of the air circulating tube or ring 7. After the loaded device is thus positioned, a suitable detergent is poured into the container of sufficient depth to completely cover the plates. The cover 2 is then secured in place on the container by means of the clamp fasteners 3, after which air is introduced, by suitable pressure, into the tube 7 through conduit 12. Air in the tube escapes upwardly therefrom through apertures 8 and causes a circulation of the detergent upwardly through the barrel members 18. The detergent thus displaced by upward movement of the same through the barrels 18 returns downwardly around both the barrel and plunger members and thereby thoroughly cleaning the members. After the members are cleansed by the detergent, the detergent is removed from the container and is replaced by as many rinses as required, with each rinse being circulated through and around the barrels and plungers by means of the passage of air from the apertures 8.

After the barrels and plungers have been thoroughly cleansed and rinsed, the loaded device is removed from the container and placed on a stand, as indicated in Figgure 15, after which plate 25 is removed. When plate 25 is removed, needle members 20, which have been thoroughly cleaned and rinsed on a separate device, are inserted in holes 17, as indicated in Figure 16, after which the device, together with the barrels, plungers, and needles, are placed in a sterilizer until the barrels, plungers, and needles are to be assembled.

When the parts are ready to assemble, the device is positioned on a stand with ribs 41 registering with slot 39 of the stand member which permits the lower ends of the barrel and plunger members to contact a table top or other surface which raises the upper ends of the members free of plate 14 in order to provide easy grasp of the parts, as indicated in Figure 16. In the assembly of the syringe parts, the respective barrels and plungers, as arranged in the plates, are assembled together, thereby obviating the necessity of having to select plungers which will match certain of the barrels.

Although the preferred embodiment of the invention has been shown and described, it is to be understood that I am not to be limited to the exact details of construction shown and described herein, but that minor changes may be made in the several parts thereof, insofar as the changes may fall within the scope of the appended claims.

Having now shown and described the invention, what I claim, is:

1. In a cleaning device for barrels and plungers of hypodermic syringes, a container, a perforated ring concentrically positioned within the container and having a tube extending therefrom exteriorly of the container and to a source of air under pressure, barrel and plunger holders removably positioned within the container above the perforated ring, perforations located in the holders with the perforations therein being in registering relation with the perforations of the ring, and with air under pressure being admitted into the ring and with the escapement of the air through the perforations of the ring turbulently agitating and forcing cleaning fluid within the container to pass upwardly through barrel members and downwardly around plunger members confined therein by means of the barrel and plunger holders.

2. In a cleaning device for hypodermic syringe barrels and plungers, a container adapted to receive a cleaning fluid, a perforated ring concentrically located within the container and connected with a source of air under pressure, a holder for hypodermic barrel and plunger members, said holder being composed of a pair of like perforated plates in spaced relation, with the perforations therein being arranged to accept barrel and plunger members in matched sets, means removably securing barrel and plungers members in the holder, with each of the barrel members being in registered relation with a perforation of the ring, and with air under pressure passing through the perforations of the ring and upwardly through the respective barrel members causing a turbulent agitation upwardly of the cleaning fluid through the barrel members and downwardly around the plunger members.

References Cited in the file of this patent

UNITED STATES PATENTS

| | | |
|---|---|---|
| 243,555 | Weymar | Feb. 5, 1907 |
| 951,466 | Volz | Mar. 8, 1910 |
| 1,492,957 | Bots | May 6, 1924 |
| 2,319,531 | Brown | May 18, 1943 |
| 2,454,602 | Gunther | Nov. 23, 1948 |

FOREIGN PATENTS

| | | |
|---|---|---|
| 572,098 | France | of 1924 |
| 741,353 | France | of 1932 |